(12) United States Patent
Alain

(10) Patent No.: US 7,591,222 B2
(45) Date of Patent: Sep. 22, 2009

(54) COMPRESSING DEVICE FOR PLASTIC BOTTLES OPTIMIZED FOR RECYCLING MACHINES

(76) Inventor: Lafond Alain, 21, 5e Rang, Asbestos, Quebec (CA) J1T 3M7

( * ) Notice: Subject to any disclaimer, the term of this patent is extended or adjusted under 35 U.S.C. 154(b) by 240 days.

(21) Appl. No.: 11/799,882

(22) Filed: May 2, 2007

(65) Prior Publication Data
US 2007/0256581 A1 Nov. 8, 2007

Related U.S. Application Data

(60) Provisional application No. 60/797,063, filed on May 3, 2006.

(51) Int. Cl.
*B30B 15/06* (2006.01)
(52) U.S. Cl. .............. 100/295; 100/214; 100/280; 100/902; 222/103
(58) Field of Classification Search .............. 100/3, 100/212, 214, 232, 264, 280, 295, 296, 902; 220/666, 737, 742; 215/391, 395, 900; 222/92, 222/95, 103; 241/99
See application file for complete search history.

(56) References Cited

U.S. PATENT DOCUMENTS

| | | | |
|---|---|---|---|
| 2,073,473 A * | 3/1937 | Gay | 222/103 |
| 4,747,496 A | 5/1988 | Rendine | |
| 4,989,743 A * | 2/1991 | Lowery | 220/737 |
| 5,025,953 A | 6/1991 | Doundoulakis | |
| 5,233,917 A | 8/1993 | Handzlik | |
| 6,365,202 B1 | 4/2002 | Ida | |
| 6,418,842 B1 | 7/2002 | Justis | |
| 7,290,486 B2 * | 11/2007 | Lafond | 100/295 |

* cited by examiner

Primary Examiner—Jimmy T Nguyen

(57) ABSTRACT

A compressing device for plastic bottles optimized for recycling machines providing carefully shaped first and second plates with one being generally convex while the other being concave so as to mate more completely and provide a flattened bottle, ready for recycling. Also, a tail serves to align the bottom of the bottle so that the bar code remains visible when the bottle is run through an automated recycling machine. There are two embodiments one has as component a stand and a tongue while another embodiment is without a stand and has a hingedly movable tail. Also, the tongue and the tail are configured and shaped so as to accept a variety of bottle bottom configurations and are also used for precisely aligning the bottom of the bottle for improving the way the bottle is compressed.

10 Claims, 14 Drawing Sheets

US 7,591,222 B2

COMPRESSING DEVICE FOR PLASTIC BOTTLES OPTIMIZED FOR RECYCLING MACHINES

Figure 1:
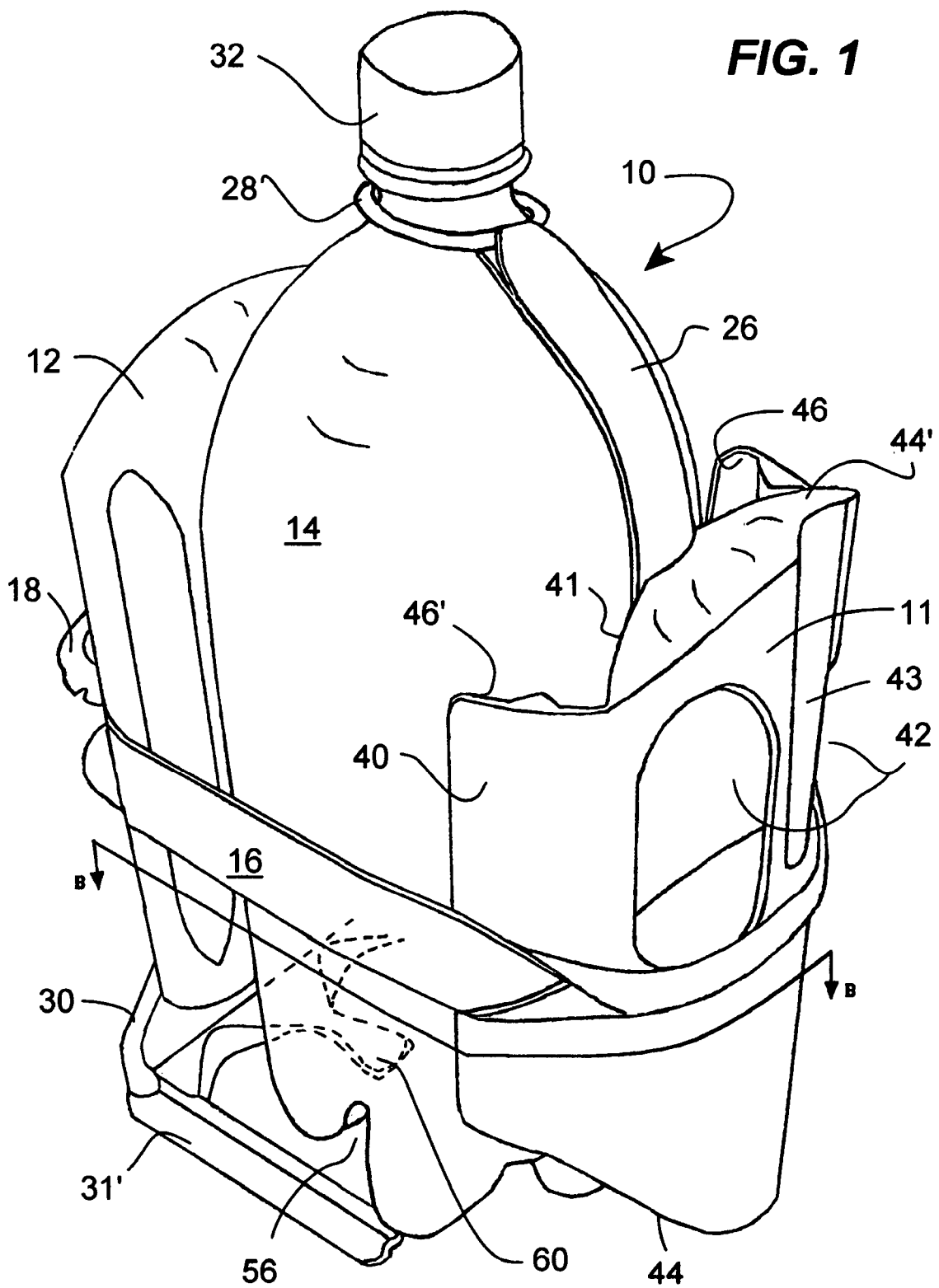

This application claims priority based on provisional application 60/797,063 filed May 3, 2006

BACKGROUND OF THE INVENTION

1. Field of the Invention

The invention relates generally to household wares but more particularly to a device which compresses plastic bottles in order to keep CO2 inside the liquid as well as reduces the surface exposed to air which reduces oxidation and at the same time reduces storage volume of the bottle.

2. Background of the Invention

Large containers are practical and economical but they have the inconvenience that if they are not used-up quickly, the CO2 will escape from the liquid and the drink will become flat. Indeed CO2 in solution tends to reach pressure equilibrium between the liquid and the ambient air, therefore, the greater the amount of air space, the quicker the release of CO2 and the faster the liquid becomes flat, which affects the taste of the beverage. There is also the problem of oxydation of the beverage which affects its taste and the storage space required by uncompressed bottles.

In order to eliminate these drawbacks, some enterprising inventors have dreamed up a variety of ways to keep air pressure inside the bottle higher than the pressure of the CO2 in solution. Some methods involve the injection of air, while more practical methods involve reducing the volume of the bottle so that there is little escape volume available for the CO2.

The problem with reducing the volume of bottles is that it can create cracks, creases or punctures in the bottle which make matters worse.

Another problem with the prior art is that they are rather large and bulky.

To correct those problems, this inventor has applied for a patent, currently pending, concerned with a device which corrected some of those problems.

With the advent of automatic plastic recycling machines which read bar code on bottles, it was considered important to make sure that once crushed, the bar code on the bottle could still be visible and that the bottle could still fit into the round opening of the machine.

Yet another problem is that once compressed with existing devices, bottles do not necessarily have a shape that can easily be entered into recycling machines or if entered, the bar code may not be legible by the machine.

For these needs, an improved method of compressing a bottle without damaging it, preserving the bar code intact and allowing for insertion into the opening of recycling machines had to be found.

SUMMARY OF THE INVENTION

It is a first advantage of this invention to crush a bottle while preserving the bar code intact.

It is a second advantage of this invention to crush a bottle in such a way that it is still insertable into the opening of recycling machines.

It is a third advantage of this invention to provide for a compressing device that is compact and requires very little space.

In order to do so, the device of this instant invention presents improvements upon a previous invention of this inventor by providing carefully shaped first and second plates with one being generally convex while the other being concave so as to mate more completely and provide a flattened bottle, ready for recycling. Also, a tail serves to align the bottom of the bottle so that the bar code remains visible when the bottle is run through an automated recycling machine. There are two embodiments one has as component a stand and a tongue while another embodiment is without a stand and has a hingedly movable tail. Also, the embodiment without a stand has a saddle going across the bottle's cap so as to hold and align both plates. The saddle consists of the same ring on both embodiments but has an extra strap, one for each plate. Also, the tongue and the tail are configured and shaped so as to accept a variety of bottle bottom configurations and are also used for precisely aligning the bottom of the bottle for improving the way the bottle is compressed.

The foregoing and other objects, features, and advantages of this invention will become more readily apparent from the following detailed description of a preferred embodiment with reference to the accompanying drawings, wherein the preferred embodiment of the invention is shown and described, by way of examples. As will be realized, the invention is capable of other and different embodiments, and its several details are capable of modifications in various obvious respects, all without departing from the invention. Accordingly, the drawings and description are to be regarded as illustrative in nature and not as restrictive.

BRIEF DESCRIPTION OF THE PREFERRED EMBODIMENT

FIG. 1 Perspective view showing the compressing device on a bottle favoring the first plate.

Figure 2:
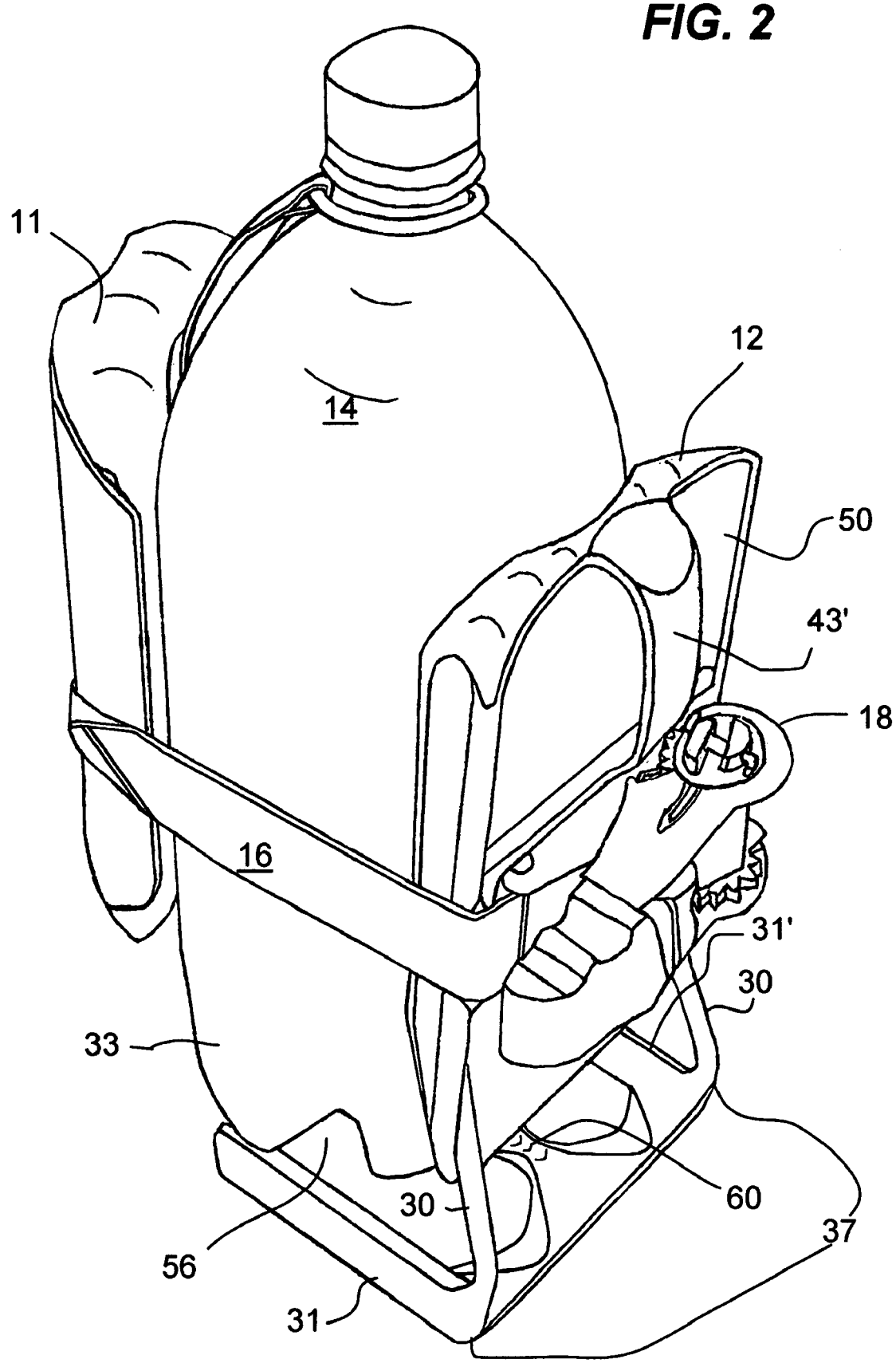

FIG. 2 Perspective view showing the compressing device on a bottle favoring the second plate.

Figure 3:
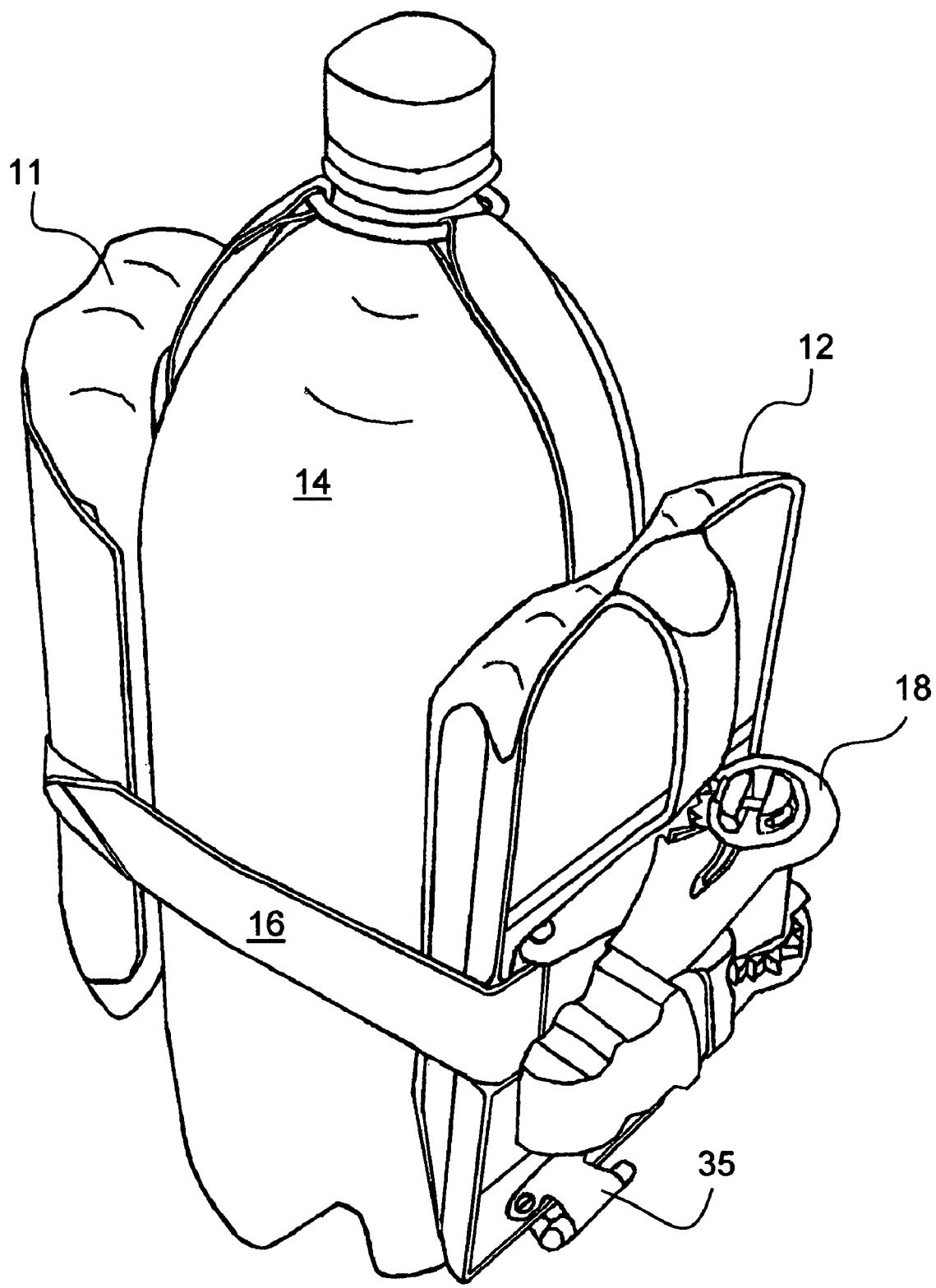

FIG. 3 Perspective view showing a variation of the embodiment of the compressing device without a stand, on a bottle and favoring the second plate.

Figure 4:
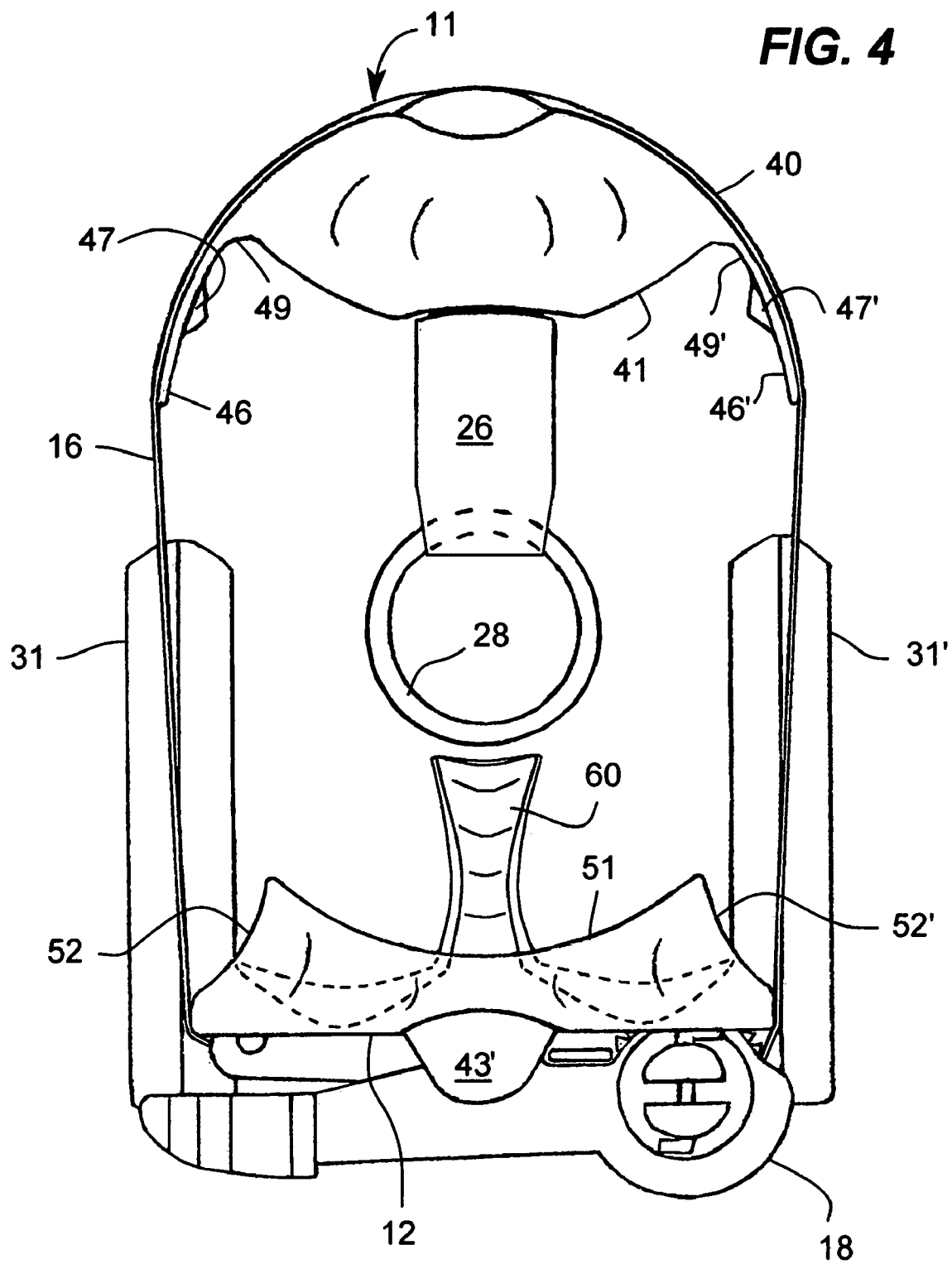

FIG. 4 Top view of embodiment of FIG. 1 without a bottle.

Figure 5:
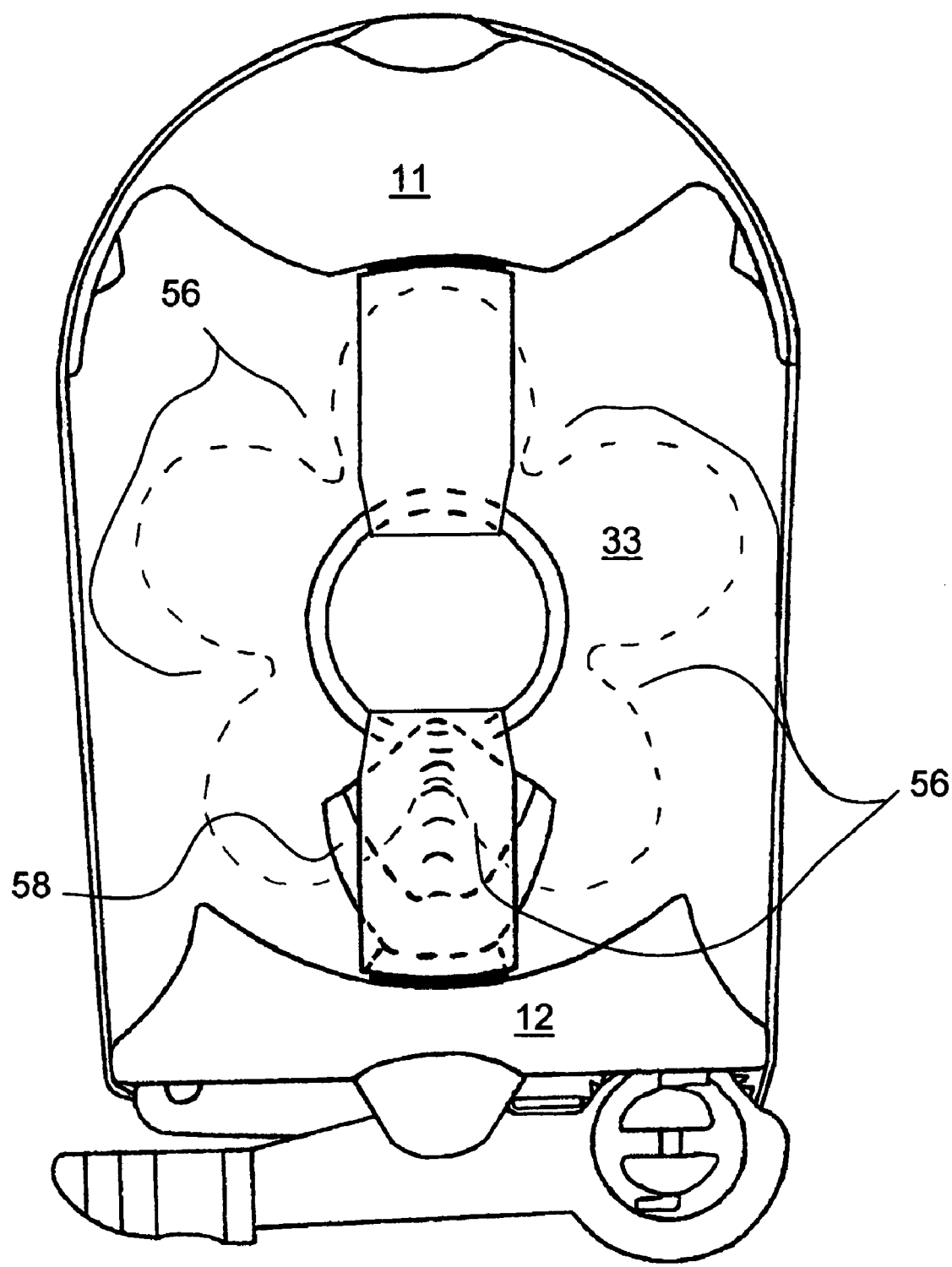

FIG. 5 Top view of the embodiment of FIG. 3 with a bottle bottom in dotted line.

Figure 6:
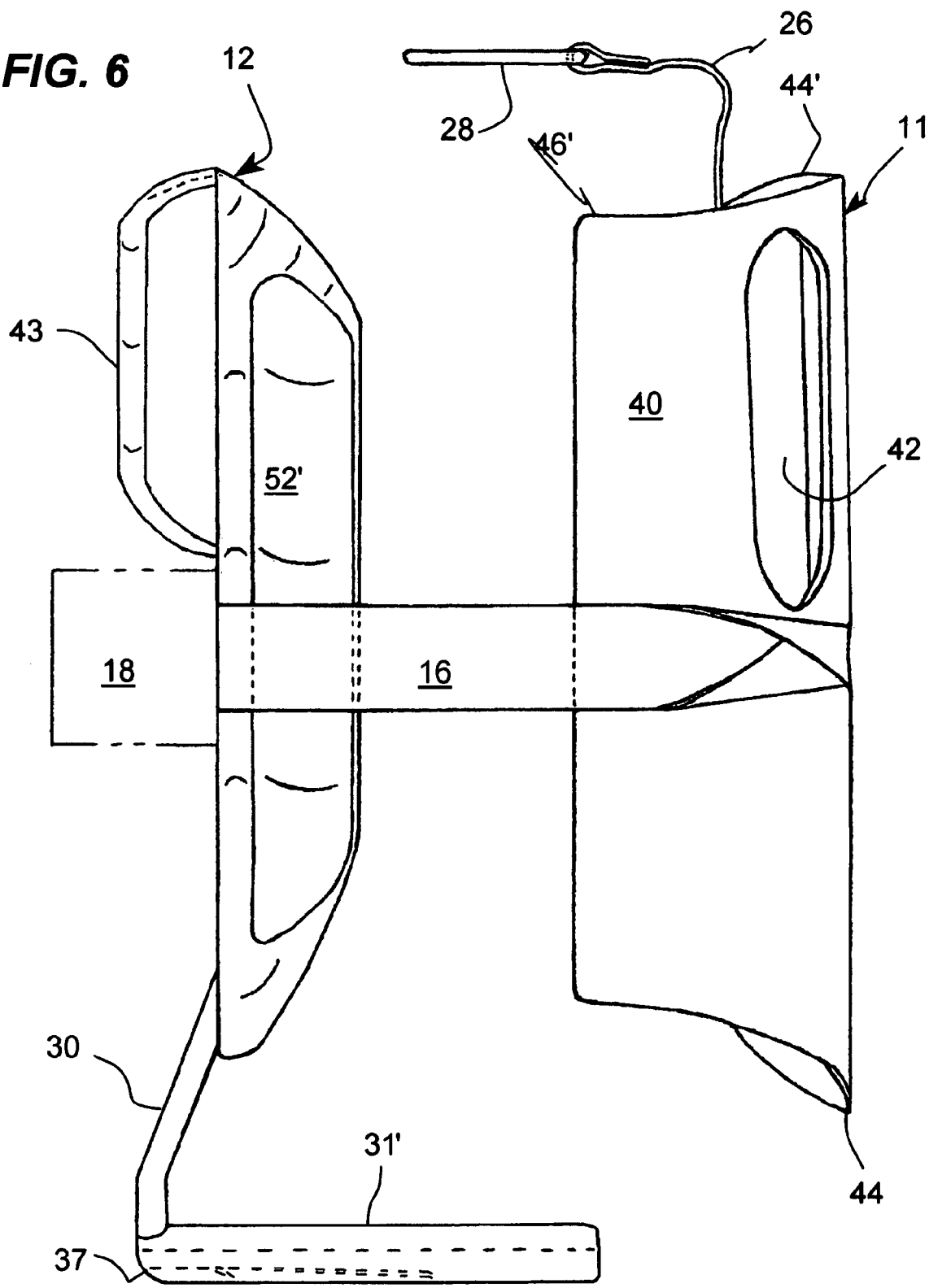

FIG. 6 Side view of the first embodiment of the compressing device (as per FIG. 1).

Figure 7:
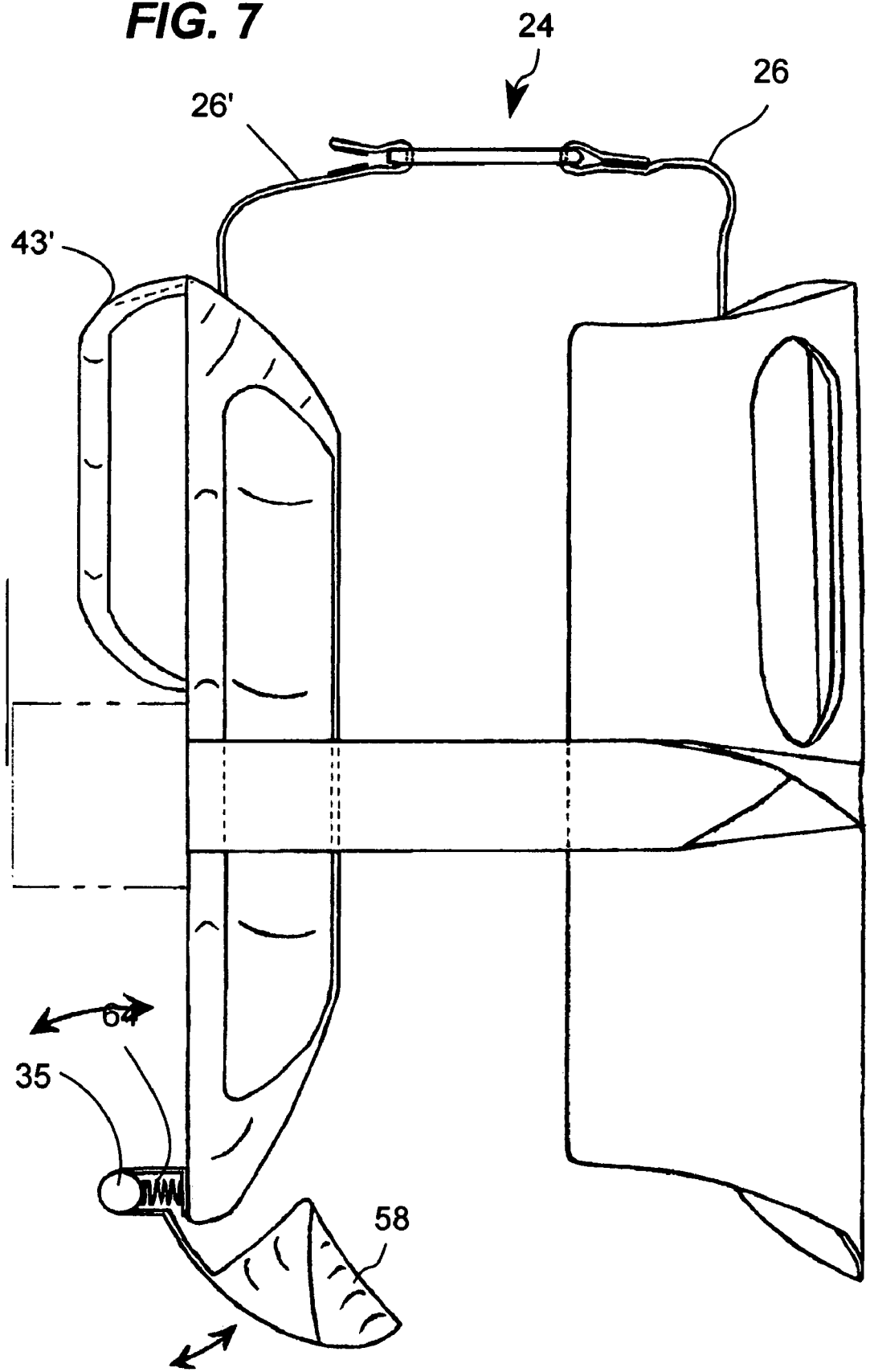

FIG. 7 Side view of the second embodiment of the compressing device (as per FIG. 3).

Figure 8:
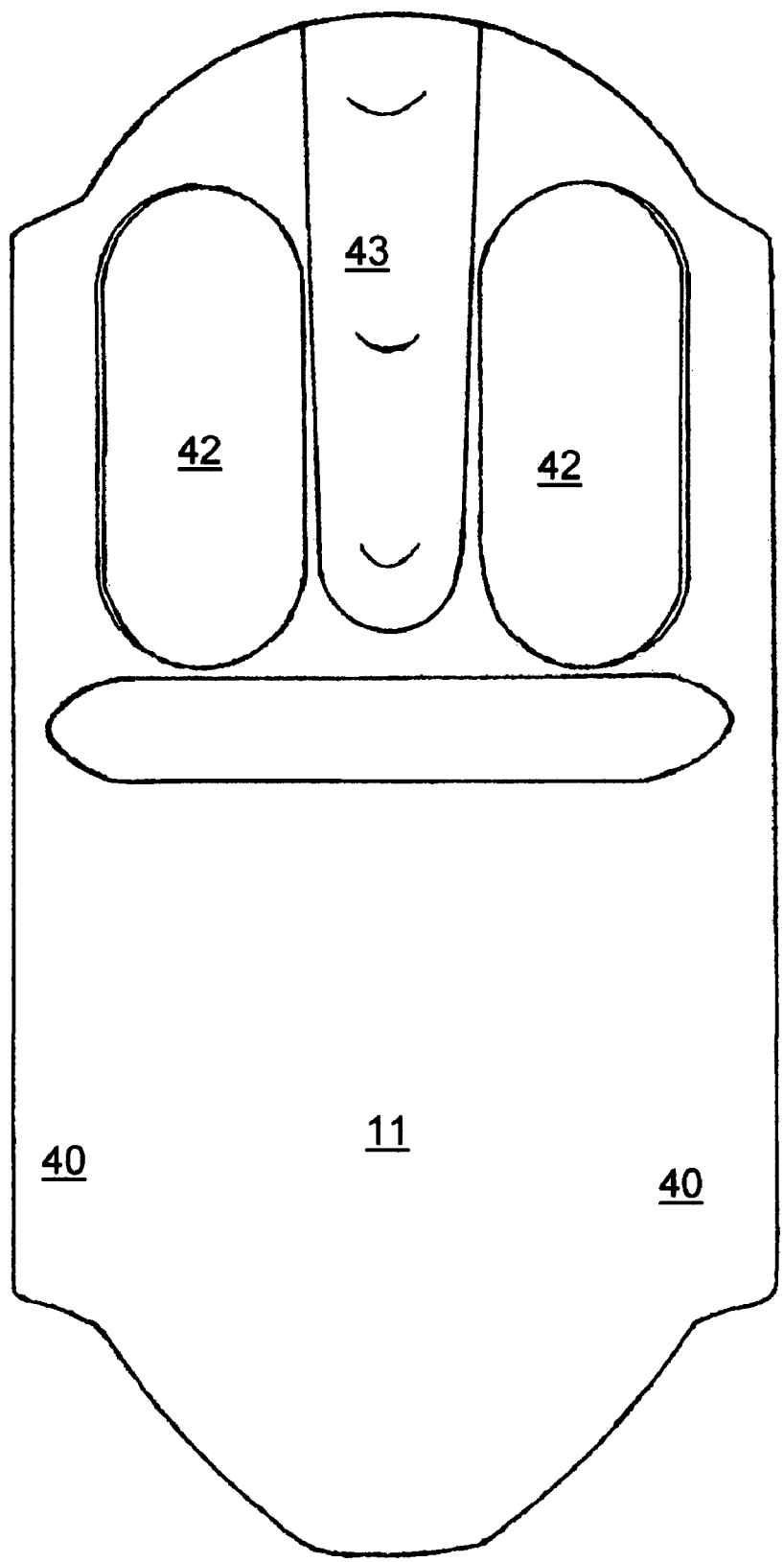

FIG. 8 Plan view of the exterior side of the first plate.

Figure 9:
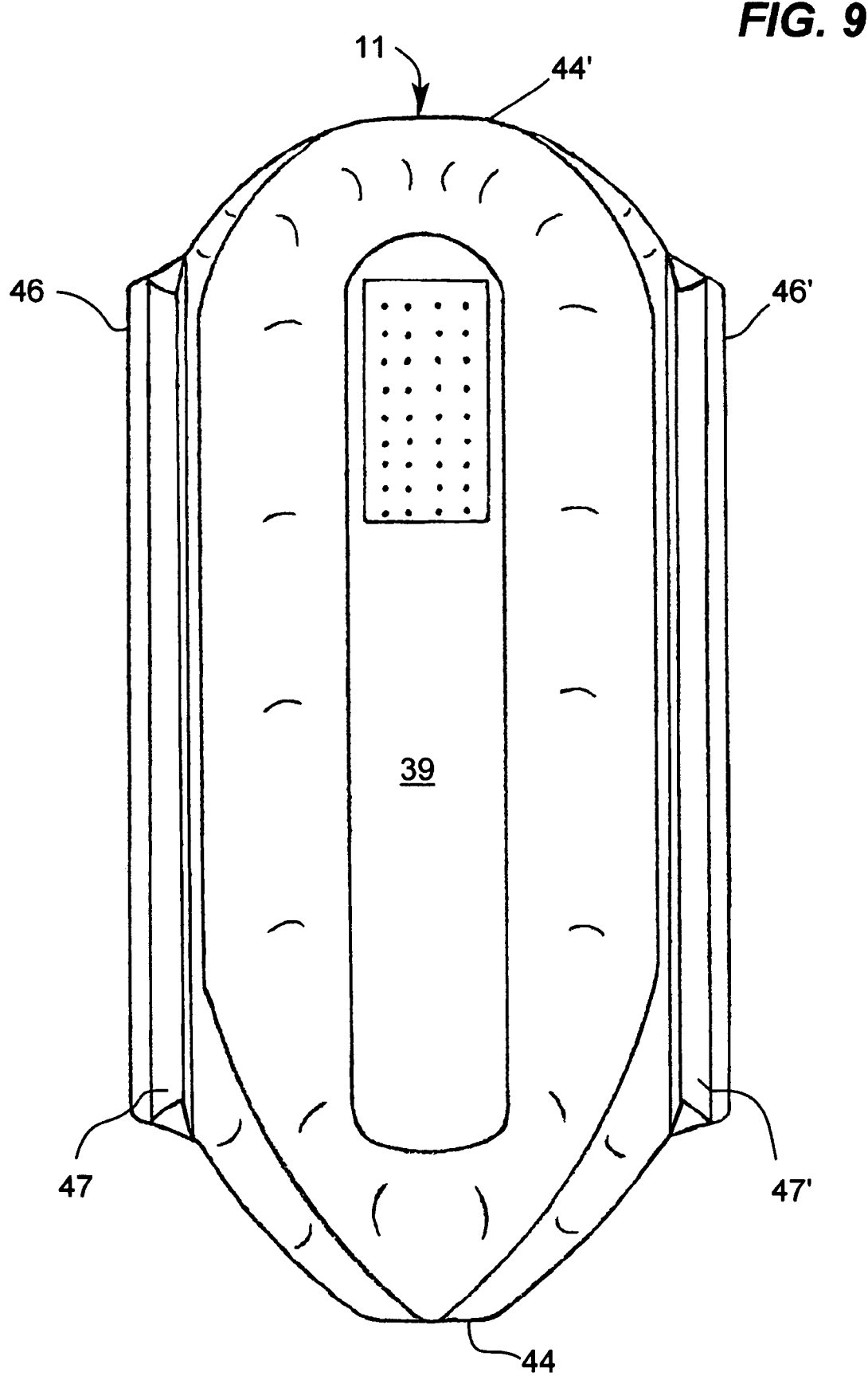

FIG. 9 Plan view of the interior side of the first plate.

Figure 10:
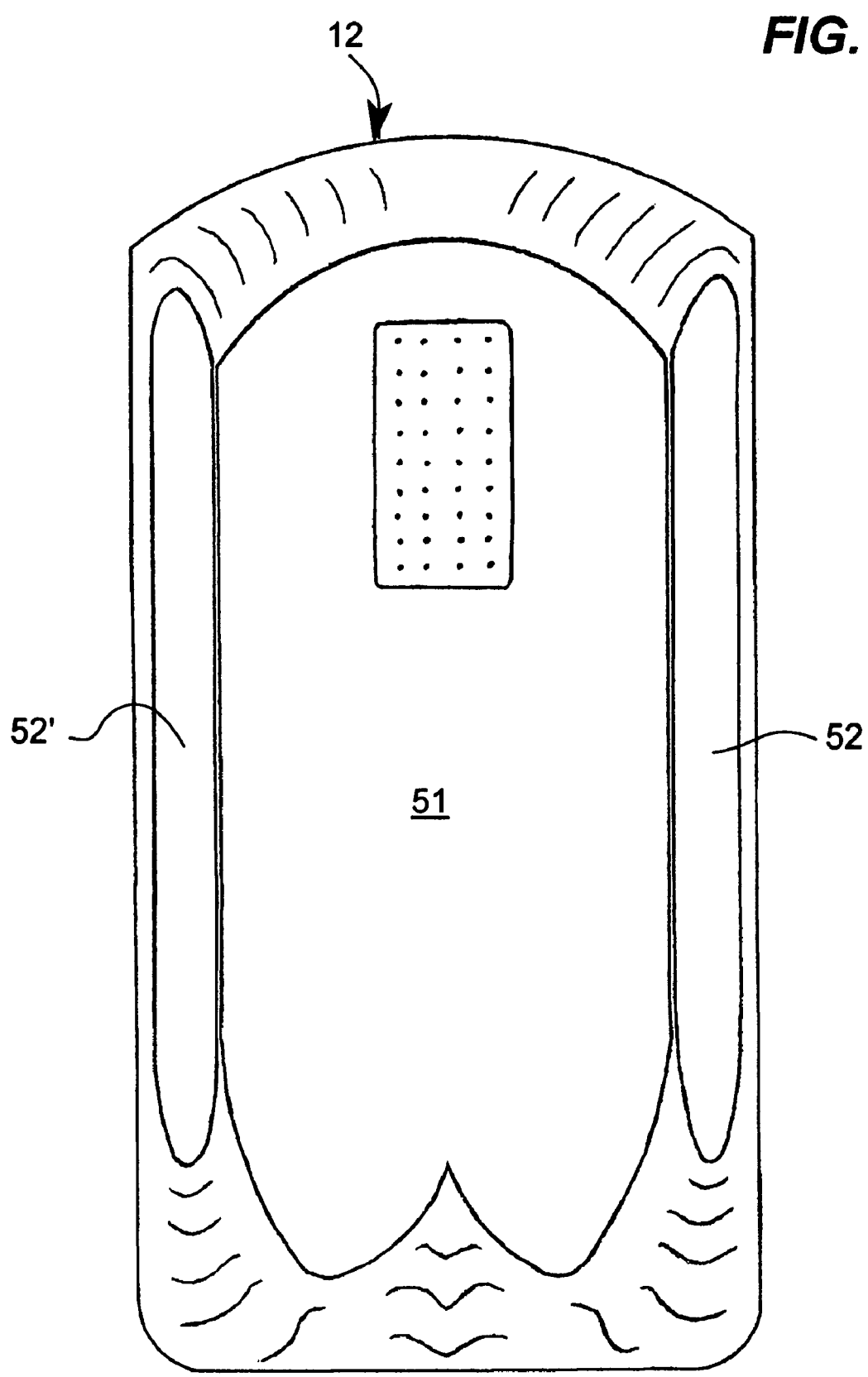

FIG. 10 Plan view of the interior side of the second plate.

Figure 11:
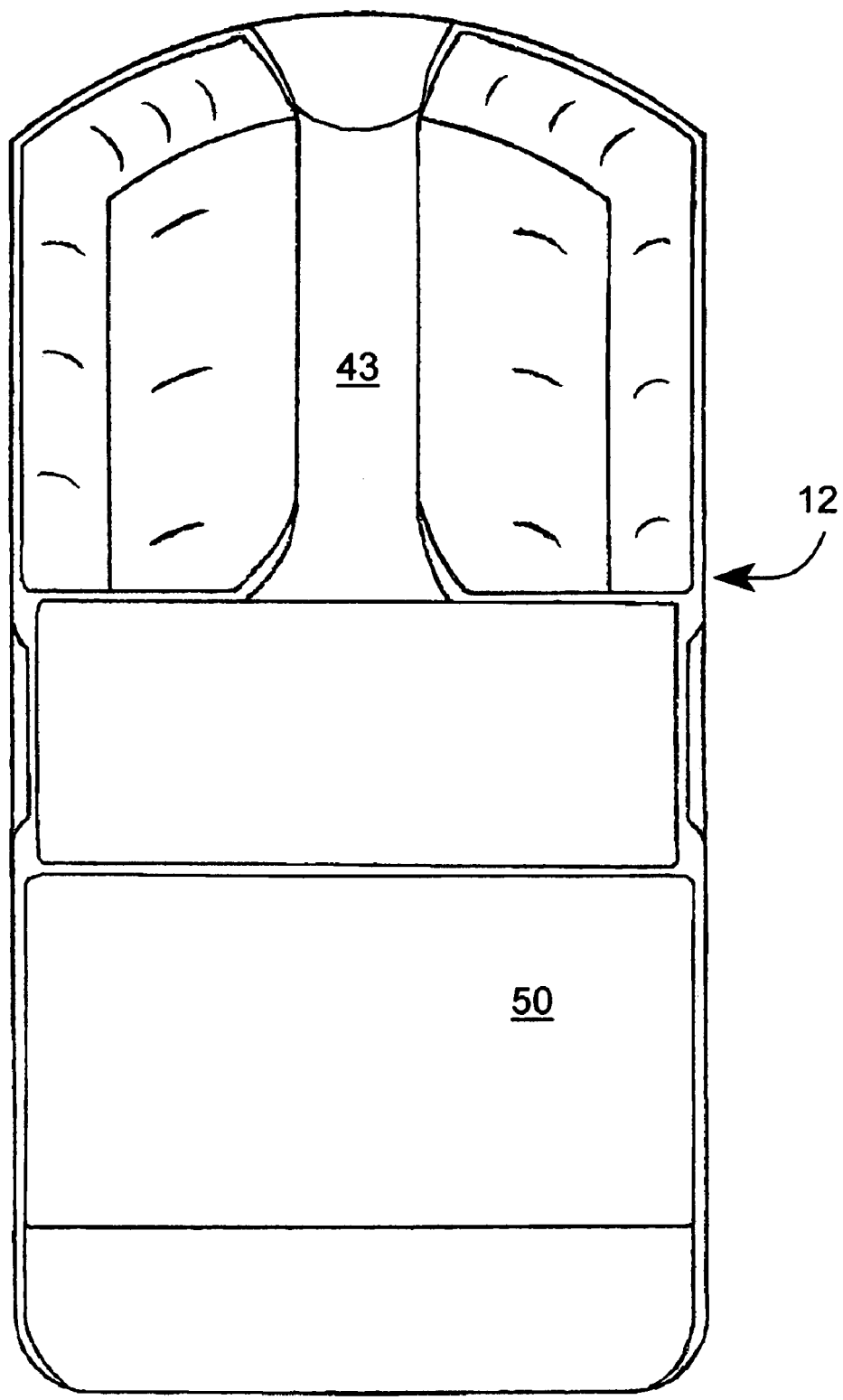

FIG. 11 Plan view of the exterior side of the second plate with the tightening means removed for clarification.

Figure 12:
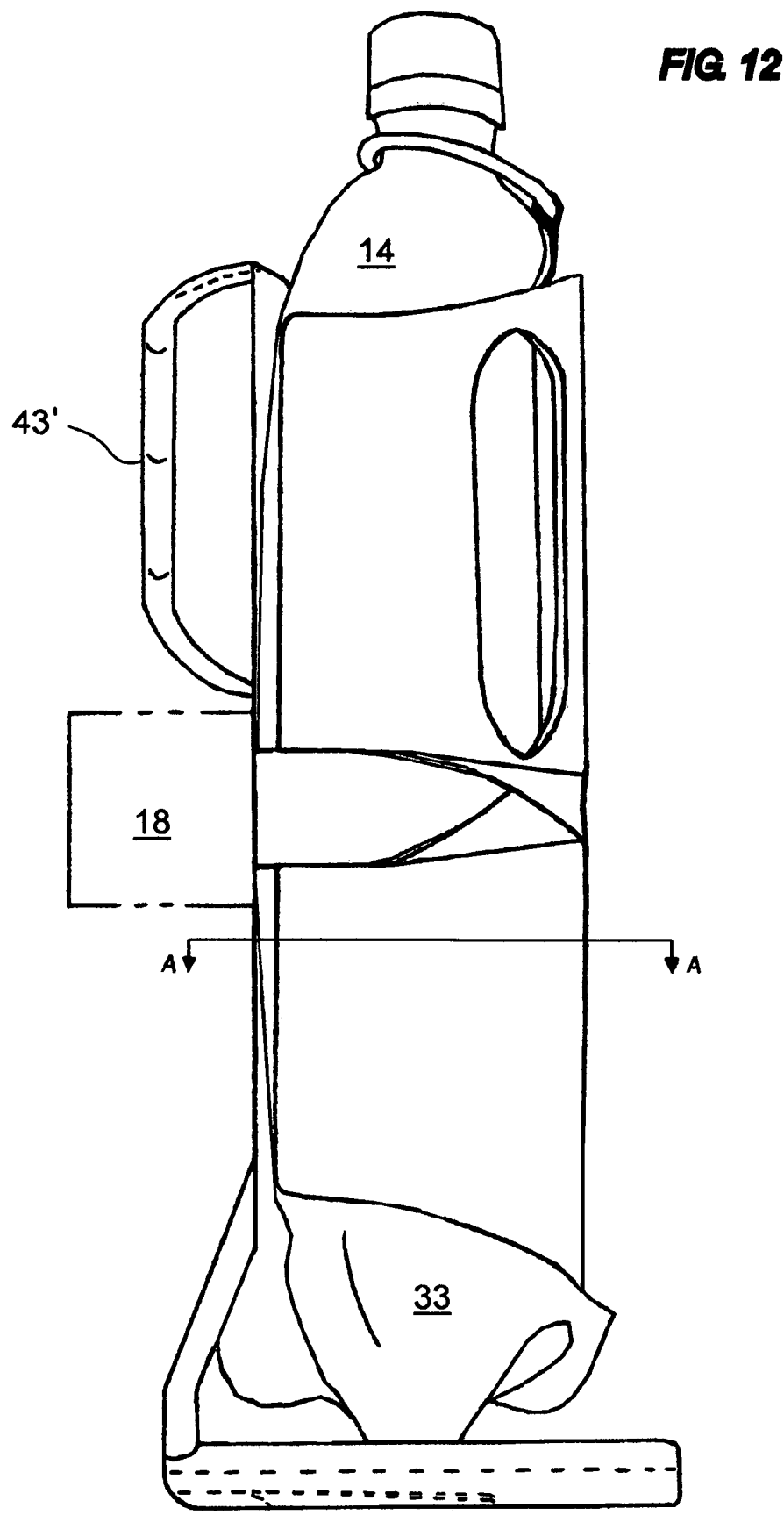

FIG. 12 Side elevation of the device with a bottle compressed.

Figure 13:
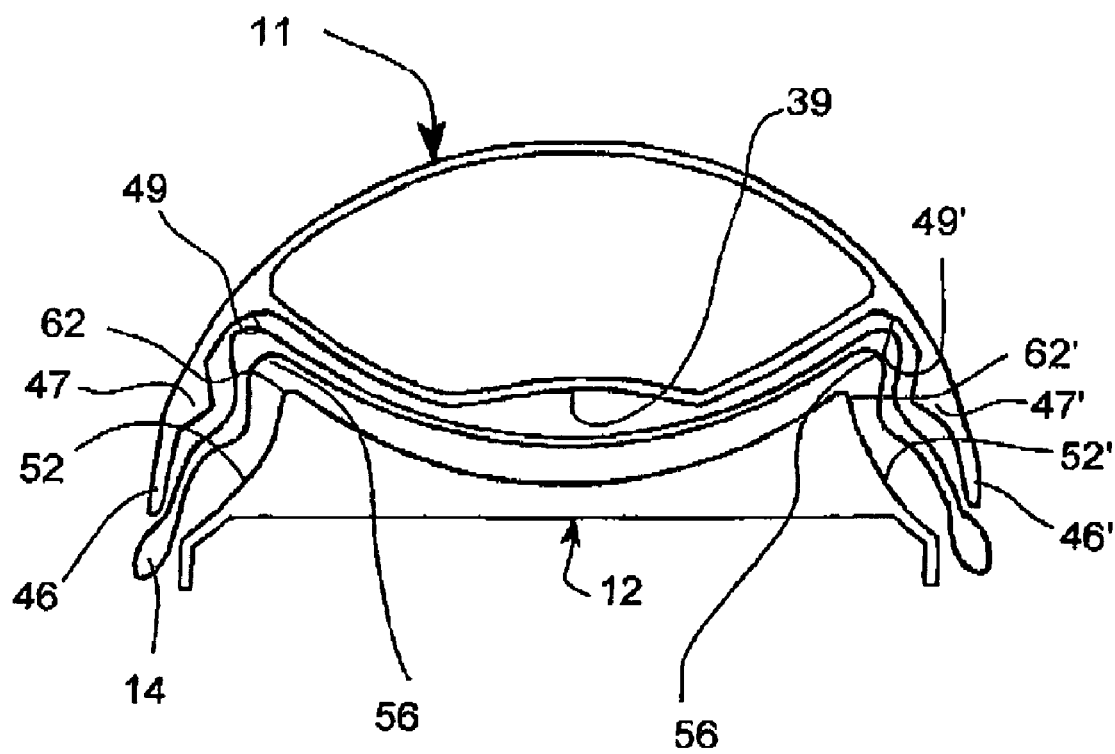

FIG. 13 Cutaway top view along line AA of FIG. 12.

Figure 14:
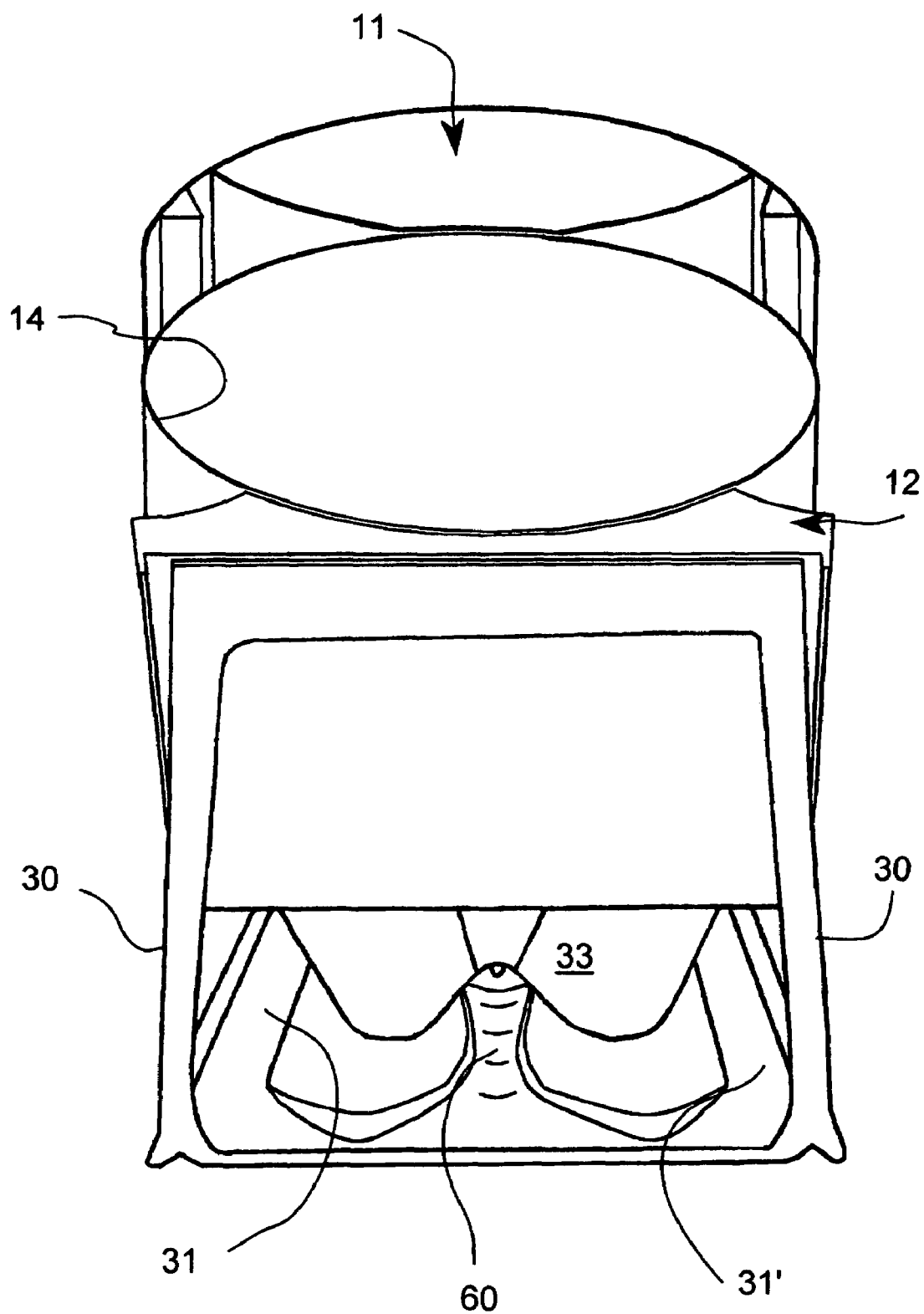

FIG. 14 Perspective cutaway view along line BB of FIG. 1

DETAILED DESCRIPTION OF THE PREFERRED EMBODIMENT

A compressing device for bottle (10) has a first plate (11) installed on one side of a bottle (14). That first plate (11) has a rounded external face (40) and hollow openings (42) which create a built-in handle (43). A second plate (12), installed on the opposite side of that bottle (14), has a flat external face (50). A strap (16), attached to a tightening means (18), allows for the first and second plates (11, 12) to be tightened against the bottle (14). The strap (16) is fixedly attached and embedded into the first plate (11) and is preferably narrower as it passes across the rounded external face (40) of the first plate (11) in order to leave room for a built-in handle (43) made into the rounded external face (40). That built-in handle (43), as well as secondary handle (43') located on the second plate (12), allow the user to pull the plates (11, 12) apart when needed or for holding the compressing device for bottle (10)

while pouring, or general handling. The strap (16) is tightened by way of a tightening means (18) located on the second plate (12) to which it is fixedly attached. The tightening means (18) is of course to bring both plates (11, 12) toward each other in a parallel fashion as is described in this inventor's copending US20060000371 application which is incorporated herein by reference.

In order to minimize damage to the bottle (14) when tightening it, the first plate (11) has a generally convex shape on a first plate interior wall (41) but with its central part (39) concave. That central part (39) initially helps in centring the bottle (14) and also contributes to making the compressing device for bottle (10) smaller. Both extremities (44, 44') of the first plate (11) are rounded off in the direction of the length and along the width of the first plate (11) so as to induce a proper deformation of the bottle (14). For example, lower extremity (44) compresses a part of the bottom (33) located in between two crevices (56) while upper extremity (44') compresses the upper part of the bottle (14). The rounded external face (40) has a pair of wings (46, 46') extending integrally therefrom. Each wing (46, 46') has a protuberance (47, 47') raising therefrom. The function of the wings (46, 46') and related protuberances (47, 47') will be explained later.

The second plate (12) has a second plate interior wall (51) which is concave and generally configured so as to mate with the shape of the first plate (11) interior wall (41). The second plate (12) has concave sides (52, 52') configured and sized to receive the protuberances (47, 47') when the bottle (14) is fully crushed. Moreover, peaks (62, 62') are aligned between crevices (56) of the bottom (33) so as to better crush that bottom (33). The upper part of the second plate (12) is also configured so as to optimally crush the upper part of the bottle (14).

In combination, the various components of the first plate (11) and the second plate (12) described hereinabove not only allow for a controlled deformation of the bottle (14) as it is pregressively compacted, but also help to preserve the shape of the bottom (33) so that it does not cause it to lose its stability. For example, in the early stage of compression, the bottle (14) will transform from a round body into a slightly oval body and as the oval shape spreads outwardly, it is captured by the wings (46, 46') and pushed by peaks (62, 62') against dips (49, 49'). The protuberances (47, 47') push against concave sides (52, 52') to create creases into the bottle (14) in order to provide additional control over the behavior of the bottle (14) so as to provide controlled compaction.

When installing the compressing device (10) on a new bottle (14), in order to facilitate proper alignment of the first plate (11), a strip (26), releasably attached to the first plate (11), and a ring (28) at one of its end, insures that the first plate (11) is positioned at the same height as the second plate (12), while tightening the first and second plates (11, 12) against the bottle (14). In the case of use of the embodiment as seen in FIG. 3, another strip (26') releasably attached to the second plate (12) holds it. In both embodiments though, the ring (28) is inserted around the cap (32).

The two embodiments, the one as in FIG. 1 and the one in FIG. 3 have differences such as embodiment of FIG. 1 having a tongue (60) configured and shaped so as to accept a variety of bottom (33) configurations, while embodiment of FIG. 3 has no stand (30) and has a hingedly movable tail (58) which serves the same purpose as the tongue (60) that is proper alignment of the bottom (33). Also, this embodiment has a saddle (24) going across the bottle's cap (32) so as to hold and align both plates (11, 12). The saddle (24) consists of the same ring (28) on both embodiments but has an extra strap (26').

The stand (30) can also be releasably attached to the second plate (12). The stand (30) has a pair of feet (31, 31'). The feet (31, 31') are set at a distance allowing for a bottle's (14) bottom (33) to fit in between and help in centring the bottle (14) in relation to the second plate (12). This precise alignment insures that the pentagon pattern created by the five crevices (56) is properly aligned since it has a bearing on the way the bottle (14) is crushed, it also serves as a good way of noticing where the bar code (not shown) is located so that it won't be on the fold of the bottle (14) once compressed so as to be unreadable by the recycling machine. In order to do so, the user needs to position the bar code against the second plate (12).

In the event that the stand (30) is not used, in order to properly position the first and second plates (11, 12), a saddle (24) consisting of two strips (26, 26') and the ring (28) is used to hold both the first and second plates (11, 12). A tail (58), hingedly attached to the second plate (12), is used for insertion into a crevice (56) located on the bottom (33). When not required, the tail (58) is hingedly swung upward so that it integrates with the second plate (12) and is completely out of the way. The tail (58) has a hinge (35) having a biasing means (67) to bias the tail (58) inside a given crevice (56). The same biasing means (64) also keeps the tail (58) retracted when not needed.

In order to use the compressing device for bottle (10), a user removes or at least loosens the bottle cap (32) and squeezes the bottle (14) with the compressing device for bottle (10) until the content reaches the top of the bottle (14). The cap (32) can then be tightly screwed back on.

When children need to pour a drink, the stand (30) is practical since it can be used to support the weight of the bottle (14) while it is tilted towards a drinking glass (not shown). This action is possible by rotating the bottle (14) around heels (37) located on the stand (30).

The hollow in both the first and second plates (11, 12) allow for insertion of ice pack if one wants to keep the beverage cold for an extended period of time such as a picnic and such.

The invention claimed is:

1. A compressing device for bottle having a first plate located on one side of a bottle, a second plate located on an opposite side of said bottle, a strap attached to a tightening means to allow tightening of said first plate and said second plate against said bottle and further; comprising:

said first plate having a rounded external face;
said second plate having a flat external face;
said second plate having concave sides configured and sized to receive protuberances;
said first plate has a generally convex shape on a first plate interior wall and said first plate interior wall has a concave central part to help in centring said bottle;
both extremities of said first plate are rounded off in direction of the length of said first plate and along the width of said first plate so as to induce a proper deformation of said bottle;
a lower extremity, located at the bottom of said first plate, compresses a part of a bottle's bottom located in between two crevices while an upper extremity, located at the upper end of said first plate, compresses an upper part of said bottle;
said rounded external face has a pair of wings extending integrally therefrom;
each said wing has a protuberance raising therefrom;
said second plate is configured so as to mate with said first plate interior wall;
said second plate has said concave sides configured and sized to receive said protuberances when said bottle is fully crushed;
peaks, located on said second plate compress said bottle against dips located on said first plate;
said peaks are aligned between crevices located on said bottle's bottom.

2. A compressing device for bottle as in claim 1 wherein:
a tail, hingedly atttached to said second plate, and configured and shaped so as to accept a variety of bottle'bottom configurations for proper alignment of said bottle's bottom.

3. A compressing device for bottle as in claim 1 wherein:
said compressing device for bottle has a stand with a pair of feet and a tongue;
said feet are set at a distance allowing for said bottle's bottom to fit in between said feet;
said tongue used for precisely aligning said bottle in relation to said second plate so as to accept a variety of bottle's bottom configurations for proper alignment of said bottle's bottom.

4. A compressing device for bottle as in claim 2 wherein:
hollow openings to create a built-in handle within said first plate.

5. A compressing device for bottle as in claim 3 wherein:
hollow openings to create a built-in handle within said first plate.

6. A compressing device for bottle as in claim 2 wherein:
a secondary handle located on said second plate.

7. A compressing device for bottle as in claim 3 wherein:
a secondary handle located on said second plate.

8. A compressing device for bottle as in claim 2 having the following method of installation:
a user positions a bar code found on said bottle against said second plate;
a saddle consisting of two strips and a ring is used for holding both said first and second plates;
said tail is used for insertion into a crevice located on said bottle's bottom;
said tail has a hinge having a biasing means to bias said tail inside a given crevice;
said biasing means to keeps said tail refracted when unused.

9. A compressing device for bottle as in claim 2 having the following method of operation:
at an early stage of compression, said bottle transforms from a round body into a slightly oval body and, as said oval shape spreads outwardly, it is captured by said wings and pushed by said peaks against said dips;
said protuberances push against said concave sides to create creases into said bottle so as to provide controlled compaction.

10. A compressing device for bottle as in claim 3 having the following method of operation:
at an early stage of compression, said bottle transforms from a round body into a slightly oval body and, as said oval shape spreads outwardly, it is captured by said wings and pushed by said peaks against said dips;
said protuberances push against said concave sides to create creases into said bottle so as to provide controlled compaction.

* * * * *